US008206676B2

(12) United States Patent
Agarwal et al.

(10) Patent No.: US 8,206,676 B2
(45) Date of Patent: Jun. 26, 2012

(54) METHOD FOR MAKING A CHLOROSILANE

(75) Inventors: Rajiv K. Agarwal, Malvern, PA (US); John Francis Lehmann, Breinigsville, PA (US); Charles Gardner Coe, Macungie, PA (US); Daniel Joseph Tempel, Macungie, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 193 days.

(21) Appl. No.: 12/754,909

(22) Filed: Apr. 6, 2010

(65) Prior Publication Data
US 2011/0113628 A1 May 19, 2011

Related U.S. Application Data

(60) Provisional application No. 61/169,414, filed on Apr. 15, 2009.

(51) Int. Cl.
*C01B 33/08* (2006.01)
(52) U.S. Cl. ........................................ 423/342
(58) Field of Classification Search ............ 423/342
See application file for complete search history.

(56) References Cited

U.S. PATENT DOCUMENTS

| 3,147,071 A | 9/1964 | Jenkner |
| 3,192,138 A | 6/1965 | Enk et al. |
| 4,053,495 A | 10/1977 | Deinhammer et al. |
| 5,401,872 A * | 3/1995 | Burgie et al. ............... 556/477 |
| 5,869,017 A | 2/1999 | Oda |
| 7,030,260 B2 | 4/2006 | Asirvatham et al. |
| 7,053,232 B2 | 5/2006 | Moulton |

FOREIGN PATENT DOCUMENTS

| EP | 0 107 432 A2 | 5/1984 |
| EP | 0146148 | 6/1985 |
| JP | 60-060915 | 4/1985 |
| JP | 60-060916 | 4/1985 |
| JP | 60-060918 | 4/1985 |
| JP | 60-060919 | 4/1985 |
| JP | 60-071513 | 4/1985 |
| JP | 60-077119 | 5/1985 |
| JP | 63-303807 | 12/1988 |

OTHER PUBLICATIONS

R.D. Verma, et al, Synthesis of Deuterated Chlorosilane and Bromosilane, Canadian Journal of Chemistry, 1963, 1652, 41.
M. Onyszchuk, The Interaction of Disiloxane with Boron Trifluoride and Trichloride, Canadian Journal of Chemistry, 1961, 808-814, 39.
R.P. Hollandsworth, et al, Halogenation of silanes by silver chloride and silver bromide, Inorganic Chemistry, 1967, 844-845,6.

(Continued)

*Primary Examiner* — Porfirio Nazario Gonzalez
(74) *Attorney, Agent, or Firm* — Rosaleen P. Morris-Oskanian

(57) ABSTRACT

The method described herein provides a method for preparing a chlorinated silane at least one end product comprising $SiH_3Cl$, $SiH_2Cl_2$, and combinations thereof in molar yields of 50% or greater with respect to silane in the feed stream. The method described herein therefore provides an end product comprising the one or more chlorinated silanes by contacting reaction mixture comprising silane and hydrogen chloride with a catalyst at a temperature and time sufficient to provide the end product.

14 Claims, 1 Drawing Sheet

OTHER PUBLICATIONS

C.B. Moore, et al, Infrared laser photochemistry of silane-chloromethane mixtures, Journal of Physical Chemistry, 1990, 4094-4099, 94.

W. More Sundermeyer, et al, Chemical Reactions in Molten Salts, Angew. Chem, 1958, 628-633.

I. Bucsi, et al, Selective monochlorination of methane over solid acid and zeolite catalysts, Catalysis Letters, 1992, 27-38.

H. E. Opitz, Monobromosilane and Dibromosilane Preparation, Reactions and Derivatives, PhD Thesis, Indiana University, 1955.

H. E. Opitz, et al, The Preparation of Monobromosilane and Organic Silyl Derivatives, Journal of the American Chemical Society, 1956, 292-294, 78.

G. Laird, et al, The Preparation and Properties of Disilanyl Iodide and Bis-disilanyl Ether, Journal of the American Chemical Society, 1960, 2151-2153, 82.

D. Dube, et al, Aluminum chloride grafted mesoporous molecular sieves as alkylation catalysts, Microporous and Mesoporous Materials, 2005, 137-144, 79.

Z. Li, et al, Silica-supported aluminum chloride: A recyclable and reusable catalyst for one-pot three-component Mannich-type reactions, Journal of Molecular Catalysis A: Chemical, 2007, 132-135, 272.

M.H. Valkenberg, et al, Immobilisation of chloroaluminate ionic liquids on silica materials, Topics in Catalysis, 2001, 139-144, 14.

A. Corma, et al, Silica-Bound Homogenous Catalysts as Recoverable and Reusable Catalysts in Organic Synthesis, Adv. Synth. Catal, 2006, 1391-1412.

S. Csihony, et al, In situ infrared spectroscopic studies of the Friedel-Crafts acetylation of benzene in ionic liquids using AICI3 and FeCI3, Green Chemistry, 2001, 307-309.

O. Glemser, et al, New procedure for the synthesis of SiH3CI and SiH2CI2, Zeit. fur Anorg. Allg. Chem., 1954, 260.

W. Sundermeyer, Fused Salts and Their Use as Reaction Media, Angew. Chem. Internat. Edit., 1965, 222-238, 4.

C.B. Moore, et al, Infrafred laser photochemistry of silane-hydrochloric acid mixtures, Journal of the American Chemical Society, 1984, 7761-7765, 106.

\* cited by examiner

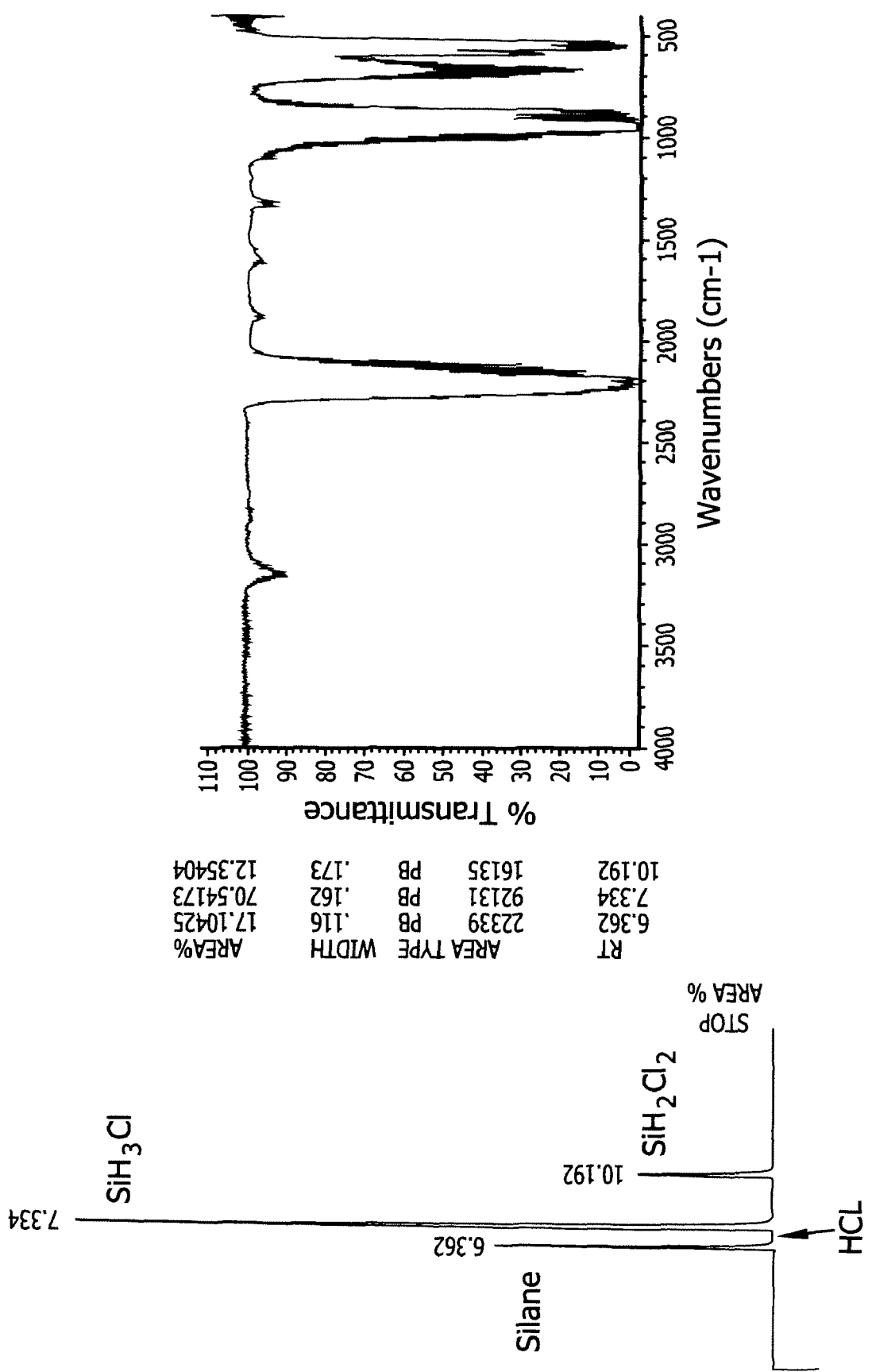

METHOD FOR MAKING A CHLOROSILANE

CROSS-REFERENCE TO RELATED APPLICATIONS

This application claims the benefit of U.S. Provisional Application No. 61/169,414, filed 15 Apr. 2009.

BACKGROUND OF THE INVENTION

Described herein are methods for making a chlorinated silane or chlorosilane such as, for example, monochlorosilane or dichlorosilane. Silanes with low chlorine content are desirable precursors for the production of functionalized silanes containing the —$SiH_3$ or —$SiH_2$— moieties. The properties of the functionalized silanes have proven to be highly tunable by variation of their substituents and have found growing application in the deposition of, for example, thin silicon dioxide or silicon nitride films which can be used in the manufacture of microelectronic devices.

Although the chlorinated silane monochlorosilane is produced on a large scale as an intermediate in the industrial synthesis of silane by disproportionation of trichlorosilane (Equations 1, 2), it is seldom isolated due to the highly-integrated nature of silane production, and the high commercial demand for silane relative to monochlorosilane.

$$2SiCl_3H \leftrightarrow SiH_2Cl_2 + SiCl_4 \quad \text{(Equation 1)}$$

$$2SiH_2Cl_2 \leftrightarrow SiH_3Cl + SiCl_3H \quad \text{(Equation 2)}$$

Though monochlorosilane can be prepared by disproportionation of dichlorosilane, or conproportionation of silane and a higher chlorosilane (e.g., $SiCl_4$, $SiHCl_3$, $SiH_2Cl_2$), it is well established that the equilibrium constants for these reactions do not favor monochlorosilane, and that extensive byproduct recycling akin to that used for silane production would be necessary to efficiently produce monochlorosilane by this method. More direct routes for the synthesis of monochlorosilane have been reported in the literature, but are not amenable to large scale synthesis due to a variety of factors including hazardous reaction conditions, co-formation of more highly chlorinated silanes, and/or undesirable catalyst properties. For example, the direct chlorination of silane with chlorine proceeds violently even in the absence of a catalyst and generates a mixture of chlorosilanes. Likewise, the aluminum trichloride catalyzed reaction of HCl with silane to form monochlorosilane is complicated in continuous processes by the volatility of $AlCl_3$, and by also by the ability of $AlCl_3$ to act as a disproportionation catalyst (in batch or continuous processes). The problems associated with $AlCl_3$ volatility have been partially addressed by use of molten salt catalysts such as $LiAl_2Cl_7$ at or above their eutectic melting points. However, these salts are highly corrosive and retain some $AlCl_3$ volatility, which unless accounted for, results in a continuously increasing melting point. Synthesis at higher temperatures exacerbates molten salt corrosivity, increases the rate of $AlCl_3$ loss, and reduces end product selectivity.

BRIEF SUMMARY OF THE INVENTION

Methods for preparing a chlorinated silanes having the formula $SiH_3Cl$ (monochlorosilane) or $SiH_2Cl_2$ (dichlorosilane) from a reaction mixture comprising silane ($SiH_4$) and a hydrogen chloride (HCl), in the presence of one or more catalysts are described herein. In one embodiment, there is provided a method for preparing an end product comprising at least one chosen from monochlorosilane, dichlorosilane, and combinations thereof comprising: providing a reaction mixture of silane and a hydrogen chloride; and contacting the reaction mixture with a catalyst at a temperature and at a time to provide the end product wherein the catalyst comprises at least one chosen from a molecular sieve, a silica support comprising $AlCl_3$, an ionic liquid comprising $Al_nCl_{(3n+1)}^-$ wherein $n \geq 1$ and combinations thereof.

BRIEF DESCRIPTION OF SEVERAL VIEWS OF THE DRAWINGS

FIG. 1 provides the FTIR and GC-TCD plots of the end-product stream from the reaction of silane and HCl in the presence of the molecular sieve catalyst comprising Na—ZSM-5(12.5) of Example 1.

DETAILED DESCRIPTION OF THE INVENTION

Methods for preparing a chlorinated silanes having the formula $SiH_3Cl$ (monochlorosilane) or $SiH_2Cl_2$ (dichlorosilane) from a reaction mixture comprising silane ($SiH_4$) and a hydrogen chloride (HCl), in the presence of one or more catalysts such as, but not limited to, solid acid or ionic liquid catalysts is disclosed herein. The methods described herein overcome the absence of scalable methods for selectively preparing chlorinated silanes such as monochlorosilane, dichlorosilane, or combinations of monochlorosilane and dichlorosilane in yields of 50 mol % or greater, 55 mol % or greater, 60 mol % or greater, 65 mol % or greater, 70 mol % or greater, 75 mol % or greater, 80 mol % or greater (based on silane usage) by reaction of silane and hydrogen chloride over a select catalyst. In one embodiment, the catalyst is comprised of a molecular sieve such as, but not limited to structure catalysts; silica supported $AlCl_3$; ionic liquids with the anion form $Al_nCl_{(3n+1)}^-$ and combinations thereof. Catalyst selection, precursor composition, catalyst contact time, temperature, pressure, and combinations thereof are used in the method described herein to selectively form one chlorosilane over another, and to favorably adapt the byproduct concentrations to down stream processing operations (i.e. purification). The method described herein therefore allows for the direct syntheses of monochlorosilane, dichlorosilane, or combinations thereof from commodity chemicals at scales appropriate to the industry without the complexity and disadvantages presented by the methods currently used for the industrial production of silane.

The method described herein uses a catalyst, such as but not limited to, a molecular sieve such as, for example, structured zeolite; a silica support comprising $AlCl_3$; an ionic liquid comprising $Al_nCl_{(3n+1)}^-$, and combinations thereof. In comparison to earlier methods for preparing monochlorosilane and dichlorosilane, such as, for example disproportionation, conproportionation, silane chlorination reactions, the method described herein offers improved yield, selectivity of the desired end-product, and/or scalability. The method described herein also overcomes the absence of a scalable method for preparing partially chlorinated silanes in high yield without the complexity and disadvantages presented by current methods used for the industrial production of silane. The method described herein therefore enables the direct production of desired precursors from commodity chemicals at scales appropriate to the industry.

In one embodiment, the end-product monochlorosilane or dichlorosilane can be produced through the contact of a reaction mixture comprising silane and anhydrous hydrogen with an acid catalyst according to Equations 3 and 4.

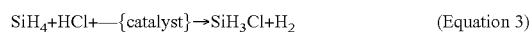
$$SiH_4 + HCl + \{catalyst\} \rightarrow SiH_3Cl + H_2 \quad \text{(Equation 3)}$$

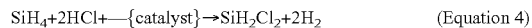
$$SiH_4 + 2HCl + \{catalyst\} \rightarrow SiH_2Cl_2 + 2H_2 \quad \text{(Equation 4)}$$

In this or other embodiments, the method described herein can be run continuously with high selectivity and yield by optimizing the contact time between the reactant gas mixture and the catalyst in a flow system to maximize precursor consumption while minimizing byproduct formation. The end product composition and yield can be optimized to meet the user's needs by varying one or more of the following conditions: HCl:silane feed ratio, gas catalyst contact time, catalyst composition (including size, porosity, support, and pretreatment procedure), temperature, and pressure.

In one embodiment, the reaction is performed in a packed bed reactor and the catalyst is a solid acid. In one particular embodiment, the solid acid catalyst may be comprised of a molecular sieve or an $AlCl_3$ on a silica support. Examples of suitable molecular sieved-based catalysts include, but are not limited to structured zeolites, such as Y-type (FAU), mordenite (MOR), ZSM-5 (MFI), ZSM-11 (MEL), ZSM-12 (MTW), MCM-22 (MWW), etc.), those having defined Si/Al ratio (e.g., non-amorphous alumina-silicates) and combinations thereof. Other molecular sieves that comprise alternative framework compositions such as those possessing mild Brönsted acidity may also be used. Examples of these alternative framework compositions include but are not limited to mild acid catalysts such as, but not limited to, SAPO-37 (FAU), SAPO-40 (AFR). The structure codes provided herein in parentheses are the well accepted designations used to define the unique arrangement of framework atoms in the structure (see, for example, Atlas of Zeolite Framework Types—Fifth Revised Edition, edited by C. Baerlocher, W. M. Meier and D. H. Olson). The cation associated with the molecular sieve catalysts include, but are not limited to, protons, alkali metal cations, alkaline metal cations, trivalent metal cations and complex cations (eg., $NH_4^+$). Enhancement of the catalyst's performance, in terms of activity, selectivity and/or longevity, may also be made in certain embodiments by the incorporation of one or more additional catalytic centers in the catalyst. In these or other embodiments, the inclusion of metals such as, but not limited to, platinum, palladium or iron, may be used.

In this embodiment or other embodiments, the reaction occurs at one or more temperatures ranging from about 20° C. to about 200° C. Exemplary temperatures for the reaction include ranges having any one or more of the following endpoints: 20, 30, 40, 50, 60, 70, 80, 90, 100, 110, 120, 130, 140, 150, 160, 170, 180, 190, or 200° C. Examples of particular reactor temperature ranges include but are not limited to, 20° C. to 200° C. or from 70° C. to 160° C.

In certain embodiments of the method described herein, the pressure of the reaction may range from about 0.1 to about 115 psia or from about 10 to about 45 psia. In one particular embodiment, the reaction is run at a pressure ranging from about 10 to about 45 psia.

In certain preferred embodiments, the reagents in the reaction mixture are gaseous. In these embodiments, the contact of the catalyst with reaction mixture may be defined in terms of defined by the bulk reactor volume displaced by the catalyst÷reactant (e.g., silane and HCl) gas flow rate. The gas-catalyst contact time may range from about 5 to about 200 seconds. Exemplary times for the contact of the reactive mixture with the catalyst include ranges having any one or more of the following endpoints: 5, 10, 20, 30, 40, 50, 60, 70, 80, 90, 100, 110, 120, 130, 140, 150, 160, 170, 180, 190, or 200 seconds. Examples of particular contact time ranges include but are not limited to, 20 to 100 or from 10 to 40 seconds.

The HCl:silane feed ratio within the reaction mixture may be selected from a range of 0.5 to 3.5, with lower values generally favoring monochlorosilane product and higher values favoring dichlorosilane product.

In embodiments wherein the catalyst comprises zeolite having a Si:Al ratio, the Si:Al ratio in the zeolitic components of the catalyst has a preferred range from 12.5 to 100. However, other embodiments of the method described herein may use Si:Al ratios outside of this range.

In one particular embodiment, the catalyst comprises a non-amorphous alumina-silicate based zeolite having a pore size that ranges from 5.3 to 7.5 Å. In these embodiments, it has been found that a particular end-product of chlorinated silane may be favored over more highly chlorinated products. Though not restrictive to the claims, this is consistent with the principal of size selectivity and calculated diameters (orientated in space to minimize cross-sectional diameter required to enter the pore) of $SiH_4$ (5.3 Å), $SiH_3Cl$ (5.3 Å), $SiH_2Cl_2$ (5.4 Å), $SiHCl_3$ (7.6 Å), $SiCl_4$ (7.7 Å). However, the present embodiment does not exclude non-amorphous alumina-silicate based zeolite catalysts or other catalysts with pore sizes outside of the 5.3 to 7.5 Å pore size range.

In one particular embodiment, the acid catalyst packed bed reactor, is used to prepare monochlorosilane in high yield from silane and hydrogen chloride, and in high selectivity with respect to dichlorosilane byproduct. In this embodiment a preferred catalyst is H—ZSM-5●NaCl with a Si:Al ratio of 12.5, prepared in situ by pretreatment of the parent Na—ZSM-5(12.5) catalyst with anhydrous hydrogen chloride. In a related embodiment, the packed bed reactor is used to prepare dichlorosilane in unexpectedly high yield and selectivity with respect to other chlorosilanes by use of native H—ZSM-5(12.5), i.e., not prepared in situ from the $Na^+$ form. The difference in end-product composition between the current and preceding embodiment, suggests that the preferred product is influenced by small changes in the internal zeolite porosity, acid strength, or combinations thereof. It is known that the presence of $Na^+$ within the catalyst reduces the pore size and lowers the effective acid strength of zeolites which may influence the selectivity of monochlorosilane vs. dichlorosilane in the product.

The origin of the appropriate acid strength to accomplish the formation of monochlorosilane could arise from Brönsted acidity inside the zeolite pores or it could be associated with a non zeolitic component in the catalyst particle. The catalysts evaluated to date have been formed catalyst particles containing a clay or silica binder. Medium to high conversion (60 to 90%) to the monochlorosilane at the low temperatures of reaction occurs on catalyst compositions that contain a clay binder. Different ZSM-5 catalysts having higher Si:Al ratios that have a silica binder are less reactive and at similar conditions show conversion of less than 40%. The critical features of the chlorination of silane are the presence of a weak Brönsted acid and active zeolite or other molecular sieve component that has pore geometry suitable to control the product distribution.

In another embodiment of the method described herein, the chlorinated silane can be prepared by contacting the reaction mixture with a silica support comprising $AlCl_3$ catalyst. The use of the silica support comprising $AlCl_3$ catalyst method described herein may be advantageous—in certain embodiments—over other $AlCl_3$ catalyst systems, such as neat $AlCl_3$ and high temperature molten salts, because the aluminum trichloride is chemically bound to the silica support, and is therefore not lost by sublimation. Retention of the active catalyst sites is favorable for prolonged and repeated reaction periods required for bulk syntheses of these chlorosilanes.

In another embodiment, monochlorosilane or dichlorosilane may be prepared in high yield by reaction a hydrogen chloride and silane precursor in the presence of an acid catalyst in the form of an ionic liquid. In this or other embodiments, the reaction occurs in a stirred tank or a bubble column. Ionic liquids with the $Al_nCl_{(3n+1)}^- (n \geq 1)$ anion form are preferred due to their strong Lewis acidity and availability, though alternative acidic chlorometallate anions that are not reduced in the presence of silane or $H_2$, such as, but not limited to the trivalent lanthanides (e.g., $Ln_nCl_{(3n+1)}^-$; Ln=lanthanide(III)) may also be used. The preferred counter ion is an alkylimidazolium cation (e.g., 1-butyl-3-methylimidazolium), but may alternatively be any cation that is stable in the presence of a composite reaction mixture and when in combination with the chosen anion forms a low melting point salt (i.e. melting point of less than about 100° C.). Refinement of the catalyst composition may be used to modify the physical properties of the ionic liquid, including but not limited to viscosity and phase behavior, and materials compatibility to facilitate stable continuous production of the desired chlorosilane. In one embodiment, the reaction may be run in a continuously operated stirred tank reactor with a subsurface silane+hydrogen chloride precursor gas feed. In another embodiment, the reaction may be run in a bubble column that may allow adequate gas-catalyst contact. The gas-catalyst residence time may range from about 5 to about 100 seconds; however, contact times outside of this range may be acceptable depending on the catalyst, other reaction conditions and desired product composition. In this embodiment, reaction temperatures may range from about 20 to about 100° C.; however, higher temperatures can be used to attain high catalyst activity. The hydrogen chloride:silane ratio in this embodiment may range from 0.8 to 2.0; however, ratios outside of this range may be advantageous depending on the composition of the desired product. The gas feed pressure of the reaction mixture may range from about 10 to about 45 psia; however, pressures outside of this range may be used.

The following examples illustrate the method for preparing a chlorinated silane described herein and are not intended to limit it in any way.

EXAMPLES

For the following examples, gas chromatography (GC-TCD), FT-IR spectroscopy, were used to analyze the gas-phase products to determine the HCl and silane conversion, product selectivities, and yields. Gas chromatographic analyses were carried out on the product effluent using a TCD equipped HP-5890 Series II GC and a 0.53 mm diameter×30m Supleco column containing 3 μm thick SPB-5 media. A Nicolet Avatar 360 FT-IR spectrometer equipped with a 1 cm long KBr gas cell was used to unambiguously identify the products in the reactor effluent gas and when necessary to qualitatively assess the product's composition.

Example 1

Continuous Synthesis of Monochlorosilane by Reaction of HCl with Silane in a Na—ZSM-5 (Si/Al=12.5) Packed Column 27 g of catalyst comprised of Na—ZSM-5 (Si/Al=12.5) on clay support was packed in a ¾-in diameter stainless steel tube reactor. The catalyst was pretreated by drying at 300° C. for 4 hours with a $N_2$ purge. After subsequent conditioning of the catalyst with hydrogen chloride, a co-feed of silane (23 mL/min) and HCl (26 mL/min) was established while maintaining the reactor at 110° C. The product stream was analyzed by gas chromatography and infrared spectroscopy prior to collection in a −78° C. stainless steel cryo-receiver. After an induction period of 8-16 hours during which monochlorosilane selectivity and yield increased, the feed rates and reactor effluent analysis were used to arrive at the following crude product composition: 5 mol % $SiH_4$, 4 mol % HCl, 49 mol % $H_2$, 35 mol % $SiH_3Cl$ and 7 mol % $SiH_2Cl_2$. The end product mixture indicates both a high efficiency of silane chlorination (91 mol %) and selectivity (84 mol %) of monochlorosilane over dichlorosilane, equivalent to 76 mol % yield monochlorosilane.

X-ray fluorescence spectroscopy and X-ray diffraction analysis of the Na—ZSM-5(12.5) catalyst after prolonged use in the packed bed reactor has demonstrated that the catalyst retains 0.97 chloride anions for every 1.00 $Na^+$ cations, and that crystalline NaCl is formed during catalyst use. Not intending to be bound by theory, these observations imply that observed induction period may be related to cation exchange between the sodium form of the parent ZSM-5 catalyst and the proton of HCl. The result is postulated to be an in situ generated form of H—ZSM-5(12.5) in which the deposited and immobile NaCl byproduct is retained in the active catalyst. The entrained salt appears to be a one factor in determining the product selectivity of ZSM-5(12.5) as the in situ generated H[NaCl]-ZSM-5(12.5) exhibits high monochlorosilane selectivity, whereas, virgin H—ZSM-5 (12.5) exhibits high dichlorosilane selectivity (see Examples 2 and 3)

Example 2

Comparison of the Continuous Synthesis of Monochlorosilane Using H—ZSM-5 (Si/Al=12.5) Versus Na—ZSM-5 (Si/Al=12.5).

28 g of catalyst comprised of H—ZSM-5 (Si/Al=12.5) on a clay support was packed in a ½-in diameter stainless steel tube reactor. The catalyst was pretreated by drying at 300° C. for 4 hours with a $N_2$ purge. After subsequent conditioning of the catalyst with hydrogen chloride, a co-feed of silane (26 mL/min) and HCl (29 mL/min) was established while maintaining the reactor at 80° C. The product stream was analyzed by gas chromatography and infrared spectroscopy prior to collection in a −78° C. stainless steel cryo-receiver. The feed rates and reactor effluent analysis were used to arrive at the following crude product composition: 16 mol % $SiH_4$, 0 mol % HCl, 53 mol % $H_2$, 8 mol % $SiH_3Cl$ and 23 mol % $SiH_2Cl_2$.

The difference in end-product composition between Examples 1 and 2 suggests that the preferred product may be influenced by small changes in the internal zeolite porosity, acid strength, or combinations thereof. It is known that the presence of $Na^+$ within the catalyst reduces the pore size and lowers the effective acid strength of zeolites which may influence the selectivity of monochlorosilane vs. dichlorosilane in the product. Further evidence for the importance of acid strength was found by evaluating a Na—ZSM-5 having Si/Al ratio of 100. It is well known that the higher Si/Al ratio increases the acid strength of the catalyst. This catalyst showed much lower conversion and selectivity for monochlorosilane indicating that increasing the acid strength would lower the yield of monochlorosilane. A similar experiment was carried out with a silicate catalyst which has the same pore structure as the ZSM-5 catalyst but very little aluminum allowing very few acid sites in the catalyst. As expected, this catalyst showed low conversion but over 90% selectivity to monochlorosilane confirming that the ZSM-5 structure was effective in producing monochlorosilane selectively and that a moderate strength of acidity was required to achieve acceptable levels of conversion over the amendable temperature range. Strongly acidic H—ZSM-5 with a Si/Al ratio of 100 which is known to be an effective selective catalyst in many hydrocarbon conversions does not have high activity for the conversion of silane to monochlorosilane under conditions where the silane is thermally stable. The preferred catalyst applicable for the production of monochlorosilane contains an active catalyst phase with a pore size that allows the monochlorosilane to exit the catalyst pore structure and a suitable acid strength to allow for a high conversion of the silane feed under the mild temperature conditions where the silane is stable.

Example 3

Continuous Synthesis of Dichlorosilane by Reaction of HCl chlorine source with Silane in an H—ZSM-5 (Si/Al=12.5) Packed Column 28 g of a catalyst comprising H—ZSM-5 (Si/Al=12.5) on a clay support was packed in a ½-in diameter stainless steel tube reactor. The catalyst was pretreated by drying at 300° C. for 4 hours with a $N_2$ purge. After subsequent conditioning of the catalyst with hydrogen chloride, a co-feed of silane (36 mL/min) and HCl (71 mL/min) was established while maintaining the reactor temperature at 130° C. The product stream was analyzed by gas chromatography and infrared spectroscopy prior to collection in a stainless steel cryo-receiver. The feed rates and reactor effluent analysis were used to arrive at the following crude product composition: 2 mol % $SiH_4$, 65 mol % $H_2$, 2 mol % $SiH_3Cl$ and 31 mol % $SiH_2Cl_2$. The end product mixture indicates both high silane chlorination efficiency (95%) and selectivity for dichlorosilane (93%) over monochlorosilane or trichlorosilane.

Example 4

Continuous Synthesis of Chlorinated Silanes with Low Degrees of Chlorination Using $AlCl_3$-Supported on Silica Catalyst Aluminum trichloride supported on silica (9 g) was loaded into a ½-in stainless steel tube reactor. Without further pretreatment, an equimolar co-feed of HCl-silane (29 mL/min) was established through the packed catalyst bed at 50° C. The product stream was analyzed by gas chromatography and infrared spectroscopy. The feed rates and reactor effluent analysis were used to arrive at the following crude product composition: 24 mol % $SiH_4$, 23 mol % HCl, 27 mol % $H_2$, 25 mol % $SiH_3Cl$ and 1 mol % $SiH_2Cl_2$.

Example 5

Continuous Syntheses of Chlorinated Silanes with Low Degrees of Chlorination Using the Ionic Liquid BMIM-$Al_2Cl_7$ as a Catalyst 306 g of butylmethylimidazolium dialuminumheptachloride (BMIM-$Al_2Cl_7$) ionic liquid catalyst was loaded into a stainless steel stirred tank reactor. A co-feed of HCl and silane (1.15:1) was bubbled through the ionic liquid catalyst at 70° C. a rate of approximately 54 mL/min. The product stream was analyzed by gas chromatography and infrared spectroscopy. The feed rates and reactor effluent analysis were used to arrive at the following crude product composition: 18 mol % $SiH_4$, 23 mol % HCl, 31 mol % $H_2$, 24 mol % $SiH_3Cl$ and 4 mol % $SiH_2Cl_2$.

Example 6

Comparison of the Synthesis of Monochlorosilane Using the Ionic Liquid [BMIM][$AlCl_4$] and [BMIM][$Al_2Cl_7$] as Catalysts 28 g of butylmethylimidzolium aluminum tetrachloride (BMIM-$AlCl_4$) ionic liquid catalyst was loaded into a glass ¾-in diameter by 7-in deep bubble column. A co-feed of silane (20 mL/min) and hydrogen chloride (38 mL/min) was introduced into bottom of the bubble column via a ¼-in Hastalloy dip tube at temperatures of 22, 50, 80 and 100° C. Though analysis by gas chromatography was not run, qualitative analysis of the effluent gas by FT-IR spectroscopy showed only trace quantities of monochlorosilane being formed, the bulk of the effluent, being the identified as the silane+hydrogen chloride feed gas. In contrast with BMIM-$Al_2Cl_7$ which readily catalyzes the chlorination of silane by HCl, the inability of BMIM-$AlCl_4$ to promote such reactions is believed to be associated with the lower $AlCl_3$ content and coupled Lewis acidity.

The invention claimed is:

1. A method for preparing an end product comprising at least one chosen from monochlorosilane, dichlorosilane, and combinations thereof, the method comprising:
providing a reaction mixture of silane and a hydrogen chloride; and
contacting the reaction mixture with a catalyst at a temperature and a time to provide the end product wherein the catalyst comprises at least one chosen from a molecular sieve, a silica support comprising $AlCl_3$, an ionic liquid comprising $Al_nCl_{(3n+1)}$ wherein n≧1 and combinations thereof.

2. The method of claim 1 wherein the catalyst comprises a molecular sieve.

3. The method of claim 2 wherein the molecular sieve comprises a zeolite.

4. The method of claim 3 wherein the molecular sieve further comprises a Brönsted acid.

5. The method of claim 3 wherein the molecular sieve further comprises a sodium cation.

6. The method of claim 2 wherein the catalyst has silica:alumina ratio ranging from 10 to 400.

7. The method of claim 2 wherein the catalyst is formed in situ.

8. The method of claim 1 wherein the catalyst comprises the silica support comprising $AlCl_3$.

9. The method of claim 1 wherein the ratio of hydrogen chloride to silane within the reaction mixture ranges from 0.5 to 3.0.

10. The method of claim 1 wherein the temperature ranges from 20 to 200° C.

11. The method of claim 1 wherein the contact time between the reactant gas and the catalyst ranges from 5 to 200 seconds.

12. The method of claim 1 wherein the pressure of the reaction mixture ranges from 0.1 to 115 psia.

13. The method of claim 1 wherein the end product comprises monochlorosilane.

14. The method of claim 1 wherein the end product comprises dichlorosilane.

* * * * *